Aug. 13, 1946.    A. J. GARDENHOUR    2,405,783
ELECTRIC HEATER
Filed Feb. 27, 1943    3 Sheets-Sheet 1
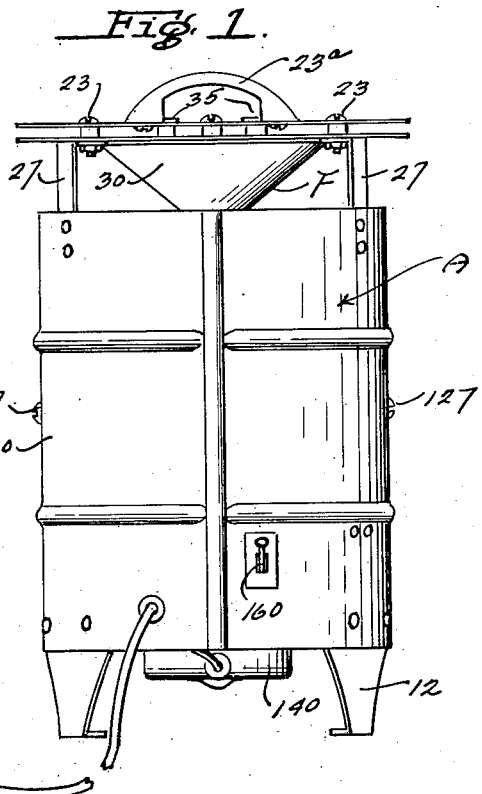
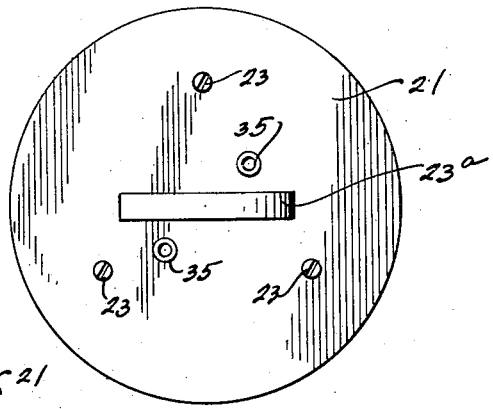
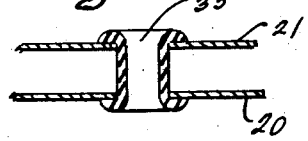
INVENTOR.
Allen J. Gardenhour.
BY
ATTORNEYS.

Aug. 13, 1946.  A. J. GARDENHOUR  2,405,783
ELECTRIC HEATER
Filed Feb. 27, 1943  3 Sheets-Sheet 3

INVENTOR.
Allen J. Gardenhour.
BY
ATTORNEYS.

Patented Aug. 13, 1946

2,405,783

UNITED STATES PATENT OFFICE 2,405,783

ELECTRIC HEATER

Allen J. Gardenhour, Waynesboro, Pa.

Application February 27, 1943, Serial No. 477,419

12 Claims. (Cl. 219—39)

This invention relates to improvements in electrical heaters.

The primary object of this invention is the provision of a relatively compact portable type of electric heater having a free circulation of air in such manner as to permit of the most efficient and economical heating thereof.

A further object of this invention is the provision of a portable electric heater having forced air circulation. The same is so arranged that the heating unit may be cut out to permit of the device being used as a cooling fan in hot weather.

A further object of this invention is the provision of a thermostatically controlled portable electric heater which is particularly well adapted for use in the heating of poultry and animal brooders and houses.

A further object of this invention is the provision of an improved electrical heater having a novel humidifying assemblage.

Other objects and advantages of this invention will be apparent during the course of the following detailed description.

In the accompanying drawings, forming a part of this specification, and wherein similar reference characters designate corresponding parts thruout the several views, Figure 1 is a side elevation of the improved electrical heater.

Figure 2 is a plan view of the heater.

Figure 3 is a cross sectional view showing part of the humidifier or vapor construction of the heater, the section being taken substantially on the line 3—3 of Figure 4.

Figure 4:
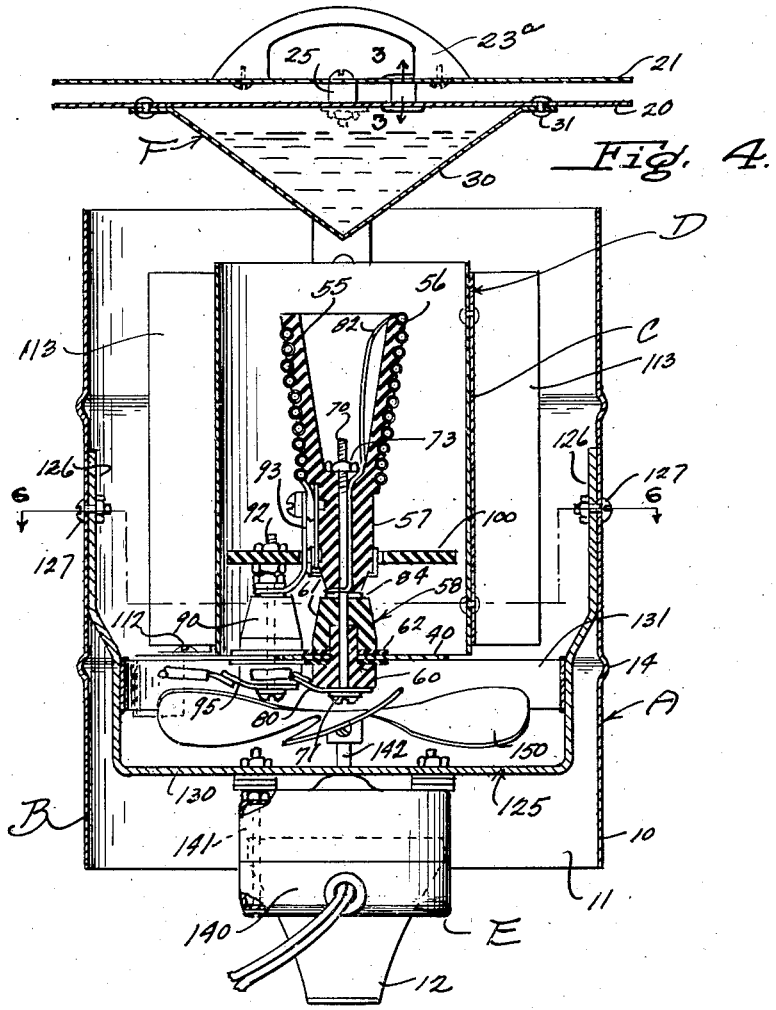
Figure 4 is a vertical sectional view taken thru the improved electrical heater.

In the drawings, wherein for the purpose of illustration is shown only a preferred embodiment of the invention, the letter A may generally designate the improved electrical heater which may consist of a housing construction B; heating unit C; radiator D; forced draft motor and fan assemblage E, and humidifier F.

The housing construction B includes a preferably cylindrical metal casing 10 open at the top and bottom and providing a passageway or chamber 11 therein for free circulation of air. The casing 10 has metal supporting legs 12 riveted or otherwise secured thereto in a triangular arrangement so as to support the lower edge of the casing 10 above a supporting surface in the manner shown in the drawings, and permit unobstructed circulation of air upwardly thru the chamber 11. All of these parts are preferably made of sheet metal and the casing 10 may be reinforced by annular beads or corrugations 14. The mode of connecting the sheet metal casing 10 is designated at the lap joint shown at 115 in Figure 6 of the drawings.

The humidifier arrangement F may be considered as part of the general housing structure. It includes lower and upper cover discs 20 and 21 respectively of preferably the same diameter; which diameter is greater than the external diameter of the upper end of the casing 10, as shown in Figure 4 of the drawings. These discs 20 and 21 are assembled in spaced relation by means of a triangular arrangement of screws 23 having spacer sleeves or washers 25. The heads of these screws are operable from the top plate 21 and the nuts lie below the lower plate 20. The space between the cover plates or discs 20 and 21 may vary, but it is preferably rather a shallow depth, so as to insulate the top disc 21, to a certain extent, and yet not admit of the loss of any heat value. The top plate 21 is provided with a detachable heat insulated handle 23ª, preferably made of plastic.

The lower disc 20 is preferably provided with casing supporting pieces 27, preferably of angle formation, and made of sheet metal. These pieces 27 are riveted on the inside at the upper end of the casing 10 and extend thereabove in a triangular arrangement. Their upper ends are radially inturned and secured to the under side of the lower cover plate 20 by the screws 23 above mentioned, as shown in Figure 1 of the drawings. The screws 23 thus serve a dual purpose of retaining the plates or discs 20 and 21 spaced and attaching the humidifier assemblage in spaced relation above the casing 10. The lower disc 20 is spaced a sufficient distance above the top edge or margin of the casing 10 to admit of free circulation of air thru this space into the room.

The humidifier construction F furthermore includes an inverted cone-shaped water receptacle 30 which is riveted at 31 to the under surface of the disc 20. It is disposed axially of the casing 10 and is of less diameter at its upper end than the internal diameter of the casing 10. The cone-shaped receptacle 30 serves the dual function of acting as a deflector for the air and a receptacle for water. It is noted that the lower end of the receptacle F extends slightly into the upper end of the chamber 11, but for the most part the humidifier receptacle-deflector 30 is disposed in the space between the cover disc 20 and the top edge of the housing 10.

The means for filling the receptacle with water is shown in Figure 3 of the drawings and consists of preferably insulated nipples 35 supported by and between the cover discs 20 and 21 providing passageways so that the compartment of the water receptacle 30 can be filled therethru. The passageway thru each nipple 35 also permits the transmission of vapor to the room in which the heater is disposed.

Referring to the heater assemblage C, the housing or casing 10 in the lower part of the chamber thereof, is provided with a diametrically disposed supporting strip 40, the ends of which are downturned or angled and riveted at 41 to the opposite side of the casing 10. Its horizontal disposition in the casing 10 is shown in Figure 4 of the drawings. If desired, this strip may be made detachable, but it is preferably permanently secured in the casing 10, and in fact it is the only part of the heater which is permanently secured to the casing, all other parts being removable, for purposes hereinafter set forth.

Figure 6:
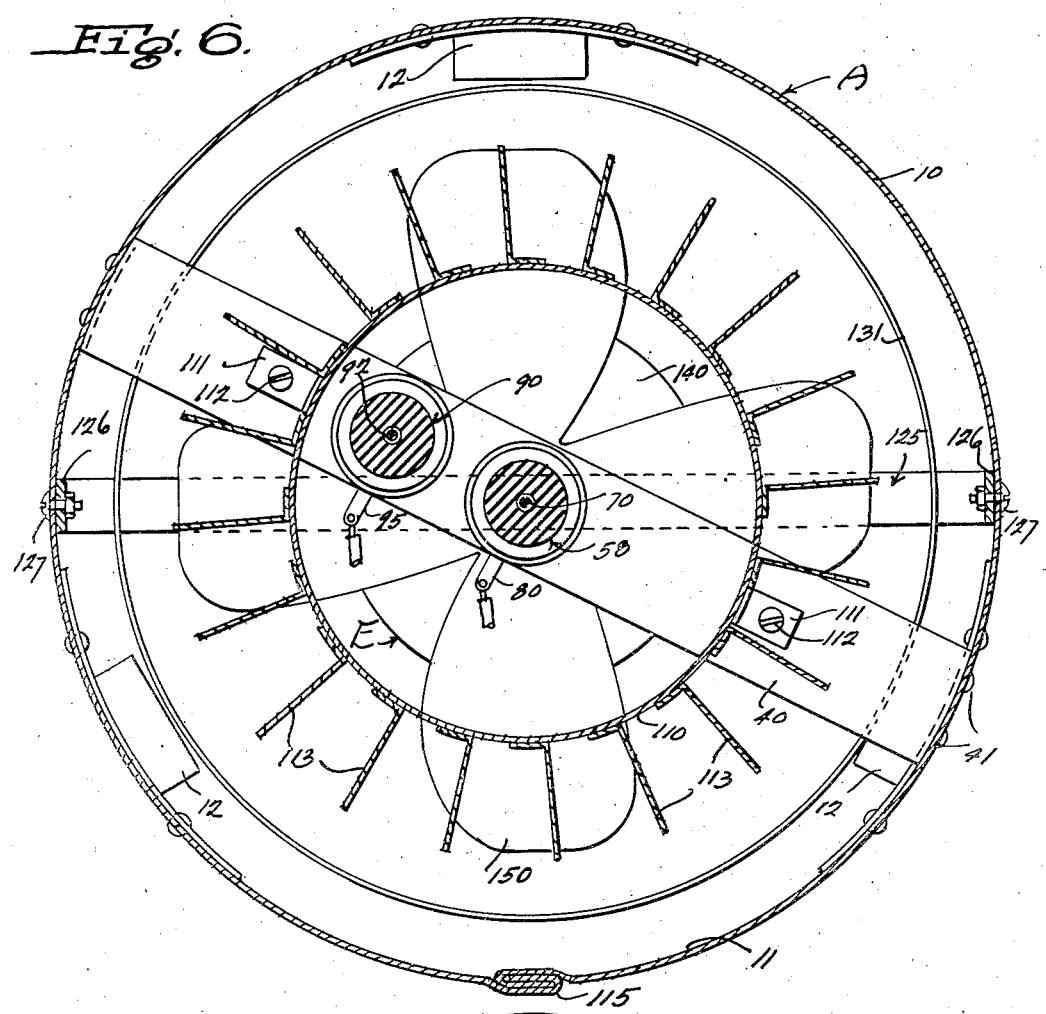
Figure 6 is a cross sectional view taken thru the heater substantially on the line 6—6 of Figure 4.
Figure 7:
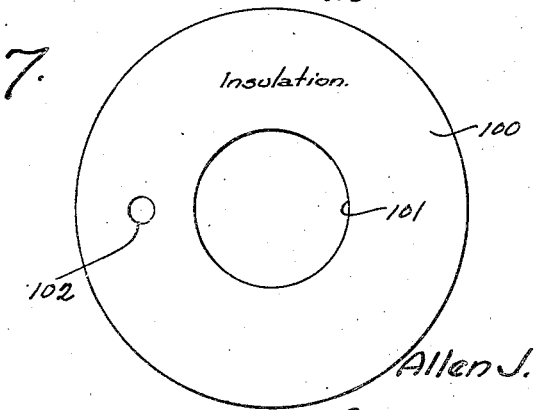
Figure 7 is a plan view of a heat insulating partition.

It is noted that the heating unit supporting strip 40 is relatively narrow, as shown in Figure 6 of the drawings, so that it will not interfere to any great extent with the free circulation of air thru the chamber 11.

The heating assemblage C furthermore includes a coil supporting cone 55, of insulation material, such as porcelain, having the resistant coil 56 wound thereon in approved manner. Improved means is provided for the mounting of this cone so that it will not become loose due to expansion and contraction incident to temperature variations. To that end the lower end of the cone is of cylindrical formation, as shown at 57 and mounted upon an insulator support 58 consisting of lower and upper interfitting parts 60 and 61, disposed respectively below and above the supporting strip 40, as shown in Figure 4. Insulation discs 62 overlie the upper and lower surfaces of the supporting strip 40 between the insulator supporting parts 60 and 61, to insulate the coil connection from this strip 40. A mounting and clamping screw 70 extends axially thru the insulator support 58 and the coil cone 55, having its screw head 71 below the insulator support part and its opposite end being threaded thru an adjusting nut 72 in the upper chamber of the cone 55, as shown in Figure 4. This screw 70 acts as a conductor and it supports a terminal 80 at its lower end below the strip 40, as shown in Figure 4.

The coil 56 has a wire connection 82 extending from the upper end thereof downwardly into the cone 55 and axially therethru; its lower end being provided with an eye and clamped in place on a metal washer 84 lying between the cone 55 and the support 58. Of course the wire 82 is thus placed in contact and conducting relation with the screw 70.

Improved means is provided for mounting and connecting the other terminal of the coil 56, consisting of an insulator terminal support 90 of preferably exactly the same construction as the support 58. It consists of interfitting parts mounted in the same insulated relation upon the strip 40 and provided with an axial screw 92 which clamps the other wire end 93 of the heater coil 56 in place, as shown in Figure 4. The screw 92, of course, acts as a conductor and it supports the other terminal 95 in place below the supporting strip or member 40, as shown in Figure 4.

In order to protect the motor and cooling fan structure and to insure a proper updraft circulation of heated air, I prefer to place a baffle ring 100, of some insulating material, such as asbestos, in surrounding relation with the lower end portion 57 of the heater cone 55, below the resistance coil 56. It is provided with a central opening 101 large enough to space the same slightly from the portion 57 of the supporting cone. It is provided with a small opening 102 therein adapted to receive the screw 92 above described; the latter receiving a nut as shown in Figure 4 of the drawings for the purpose of clamping the baffle ring 100 in position.

The radiator D, of course, plays an important part in its association with the heater unit. It consists of a cylindrical casing portion 110 open freely at its upper and lower ends, having the passageway therethru of slightly greater diameter than the external diameter of the baffle ring 100. The casing 110 is of course spaced from the casing portion 10 of the main housing and the air is adapted to freely circulate in this space between the casings 10 and 110. The radiator casing 110 is preferably provided with angle feet 111 at the lower end thereof and externally thereon, for receiving screw bolts 112 by means of which casing can be detachably clamped upon the supporting strip 40, as shown in Figure 6 of the drawings.

The radiator D furthermore includes upright fins 113 welded or otherwise secured externally upon the radiator casing 110 in a radially disposed relation exteriorly thereon. The fins 113 extend into the space between the casings 10 and 110 and their outer edges terminate short of the inner surfaces of the casing 10, in the relation shown in Figure 4 of the drawings. It is to be particularly noted that the baffle ring 100 does not entirely obstruct the passageway thru the radiator casing 110, but substantially closes that passageway so that the air must be heated via the radiator construction between the casings 10 and 110. It is obvious that this insulating ring 100 will protect the fan and motor assemblage and also promote upward deflection of the heated current.

Referring to the motor-fan assemblage E, I prefer to provide a rather strong U-shaped supporting bracket 125, the upstanding leg portions 126 of which are spaced so as to fit against the inside of the casing 10 to be detachably clamped there as by bolts 127. The lower ends of these upstanding legs are inturned and spaced from the sides of the casing 10 and connected by the horizontal bight portion 130 upon which the motor and fan are supported. The lower ends of the legs of the bracket 125 are secured in stable position against vibration by a ring or annular support 131, which may be welded to these legs in the position shown in Figure 4 of the drawings, so that the said ring will lie below but in supporting contact with the ends of the resistance unit supporting bracket or strip 40 above described, and as shown in Figures 4 and 6 of the drawings. The bight portion of the bracket 125 is of course angularly positioned with respect to the length or run of the strip 40, as is shown in Figure 6 of the drawings, and this bracket 125, while of heavier material than the other supporting parts of the housing and radiator, is relatively narrow and will not obstruct free circulation of air thru the casing 10, to any appreciable extent.

The motor 140 is detachably secured by bolts 141 to the portion 130 of the bracket 125, as shown in Figure 4 of the drawings, so that the said motor lies in the extreme lower end of the casing 10; partially projecting downwardly therethru, but spaced from the feet of the supporting legs 12. The motor shaft 142 extends upwardly thru the bracket portion 130 and is provided with a fan 150 on the upper end thereof lying in the space above the bracket portion 130, and below the supporting bracket 40. The fan 150 is of a diameter to extend beyond the radiator casing 110 for the deflection of air in a forced draft upwardly thru the space between the radiator casing 110 and the housing casing 10.

Figure 5:
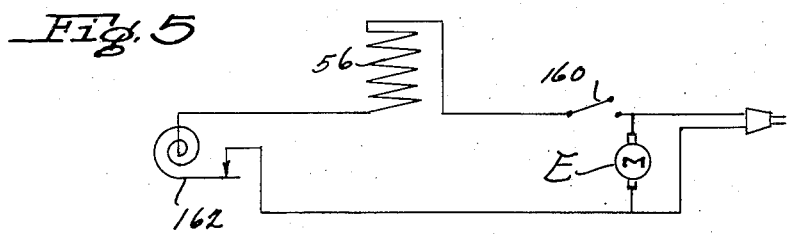
Figure 5 is a diagram of the wiring arrangement of the heater.

It is an object of this invention to permit the heating unit to be placed out of operation while utilizing the device as a cooling fan in warm weather. To that end, I provide a switch 160 which can cut out the resistance unit 56, as shown in the diagram in Figure 5 of the drawings. In this wiring system I may also place a thermostat 162 so that the device may be used as a heater in poultry brooders and animal warming housings.

It is readily apparent that the radiator unit E can be disconnected from the housing by removing the cover assemblage. It is also readily apparent that the entire motor-fan assemblage can be disconnected by loosening the bolts 127 and pulling it down thru the casing 10. The heating unit, is, of course, detachably supported upon the bracket 40 and the parts thereof are readily accessible upon disconnection of the radiator and motor units. Thus, the device lends itself to a practical application. It can be economically manufactured and will insure an efficient circulation and distribution of heated air.

Various changes in the shape, size and arrangement of parts may be made to the form of invention herein shown and described, without departing from the spirit of the invention or the scope of the following claims.

I claim:

1. In a heater, the combination of a heater casing having the upper end thereof entirely open, a double walled cover having means directly connecting and supporting said walls in spaced relation, means mounting the double walled cover in appreciably spaced relation wholly above the top edge of the casing by widely spaced narrow supporting members which will not appreciably obstruct the circulation of air thru the casing and laterally outwardly thru the space between the cover and top of the casing, and handle means on the top wall of the cover.

2. In an electrical heater, the combination of an upstanding conduit-like casing providing a passageway therethru, a radiator unit supported in the casing consisting of a conduit-like body mounted so as to be spaced from the inner surfaces of the walls of the casing first mentioned, an electrical heating unit in the radiator conduit, heat conducting fins externally on the radiator conduit extending into the space between the radiator conduit and the first mentioned casing, motor-fan means carried by the casing below said radiator for directing air circulation upwardly thru the space between the radiator and the casing, and a motor protecting insulation baffle in the radiator conduit below the electrical heating unit and above the fan.

3. In an electric heater, the combination of a casing open at its upper and lower ends and providing a passageway therethru, a radiator conduit in the passageway of the casing of heat conducting material spaced from the inner walls of the casing to provide a passageway between the conduit and walls of the casing, an electrical heating unit, means mounting the electrical heating unit in the radiator conduit, an electrical motor fan supported in the casing passageway below the radiator conduit, and a motor fan protecting baffle of insulation material mounted in the radiator conduit between the motor and the heating unit and between the heating unit and the means which mounts the heating unit in said conduit.

4. In an electrical heater, the combination of a casing having a passageway therethru open at its ends, a radiator conduit, supporting means mounting the conduit in the passageway of the casing so as not to obstruct the flow of air thru the passageway, an electrical heating unit including an insulation core and a resistance coil wrapped thereon, means detachably mounting said core upon said supporting means, a contact connector mounted upon said supporting means for one end of said coil, a second contact connector mounted upon said supporting means for the other end of said coil, and a baffle of insulation material mounted upon the last mentioned contact connector below the heating coil and within the radiator conduit.

5. In an electrical heater, the combination of a casing having a passageway therethru open at its ends, a radiator conduit, supporting means mounting the conduit in the passageway of the casing so as not to obstruct the flow of air thru the passageway, an electrical heating unit including an insulation core and a resistance coil wrapped thereon, means detachably mounting said core upon said supporting means, a contact connector mounted upon said supporting means for one end of said coil, a second contact connector mounted upon said supporting means for the other end of said coil, a baffle of insulation material mounted upon the last mentioned contact connector below the heating coil and within the radiator conduit, and an electrical motor fan mounted in the passageway of the casing below said insulation baffle.

6. In a heating unit the combination of a casing, heating means in the casing, a double walled cover including spaced upper and lower walls, bolt and bushing means in the space between the walls of said cover spacing said walls so that circumferentially they are entirely open to the space between the walls, a humidifier carried below and by the lower wall, conduit means connected with the walls extending through the space between said walls and opening the chamber of the humidifier above the upper wall.

7. In an electrical heater the combination of a casing having lateral enclosing walls and defining a chamber open at the top and bottom thereof, a radiator conduit defining a chamber therein open at the top and bottom thereof, said conduit being less in width than the casing, means mounting the radiator conduit within the casing in spaced relation with the inner surfaces thereof, a fan and motor structure mounted upon the casing below said radiator conduit for circulating air upwardly through the space exterior of the conduit and within the casing, an electrical unit mounted within the radiator conduit, and insulation means in the lower part of the electrical conduit between the electrical heating unit and the fan and motor structure for protecting the latter against radiation of heat therefrom.

8. In an electrical heater the combination of a cylindrical-shaped casing structure having a chamber therein open at the top and bottom thereof, a substantially cylindrical-shaped radiator conduit, means mounting it in the casing in spaced relation with the inner walls thereof to define an annular passageway between the same and said walls of the casing, an electrical heating unit in said radiator conduit, a narrow bracket support connected with said casing in the lower part thereof extending transversely thereof below said radiator conduit, a fan and motor structure mounted upon said bracket, the fan extending at its ends appreciably beyond the outer walls of said radiator conduit for direct travel of air into the space between the radiator conduit and said casing, and a ring-shaped member mounted upon said bracket within the plane of positioning of said fan and in position beyond the outer walls of said radiator conduit.

9. In an electrical heater the combination of a casing structure having a chamber therein open at the top and bottom thereof, a U-shaped bracket including legs and a cross portion, means detachably connecting the upper ends of said legs to the casing, the lower ends of said legs being spaced inwardly from the upper ends thereof and supporting a narrow strip at the lower ends thereof, a motor detachably mounted upon said strip therebelow having a fan operatively connected therewith and mounted above the strip, and a ring-shaped member mounted upon the closer spaced lower ends of said legs within the plane of mounting of said fan and spaced slightly from the tip ends of said fan, and an electrical heating unit mounted upon and within the casing above said fan.

10. In an electrical heater the combination of a casing structure having a chamber therein open at the top and bottom thereof, a U-shaped bracket including legs and a cross portion, means detachably connecting the upper ends of said legs to the casing, the lower ends of said legs being spaced inwardly from the upper ends thereof and supporting a narrow strip at the lower ends thereof, a motor detachably mounted upon said strip therebelow having a fan operatively connected therewith and mounted above the strip, a ring-shaped member mounted upon the closely spaced lower ends of said legs within the plane of mounting of said fan and spaced slightly from the tip ends of said fan, and an electrical heating unit mounted upon and within the casing above said fan including a radiator conduit having a passageway therethrough and outer walls spaced from the sides of the walls of the casing and inwardly appreciably from the tip ends of the fan.

11. In an electrical heater the combination of a casing structure having a chamber therein open at the top and bottom thereof, a U-shaped bracket including legs and a cross portion, means detachably connecting the upper ends of said legs to the casing, the lower ends of said legs being spaced inwardly from the upper ends thereof and supporting a narrow strip at the lower ends thereof, a motor detachably mounted upon said strip therebelow having a fan operatively connected therewith and mounted above the strip, a ring-shaped member mounted upon the closely spaced lower ends of said legs within the plane of mounting of said fan and spaced slightly from the tip ends of said fan, an electrical heating unit mounted upon and within the casing above said fan including a radiator conduit having a passageway therethrough and outer walls spaced from the sides of the walls of the casing and inwardly appreciably from the tip ends of the fan, and an insulation disc mounted in said radiator conduit below the heating unit for protecting the fan and motor structure against rays of heat from said heating unit.

12. In an electrical heater the combination of a conduit-like casing having a passageway therethrough open at the top and bottom thereof, a radiator unit supporting the casing passageway including a conduit-like housing the external walls of which are spaced from the inner surface of the casing, an electrical heating unit in the conduit-like housing, a motor, means mounting the motor upon the casing below said radiator unit conduit housing, and a flange operatively connected to said motor having a blade structure of a length to extend at the outer end thereof appreciably beyond the external wall surfacing of said radiator unit conduit housing for direct throw of air currents therefrom into the space between the external surface of said radiator unit conduit housing and the inner surface of the casing without surface deflection into said space.

ALLEN J. GARDENHOUR.